(12) United States Patent
Kroll et al.

(10) Patent No.: US 8,218,212 B2
(45) Date of Patent: Jul. 10, 2012

(54) DEVICE FOR THE PRODUCTION OF HOLOGRAPHIC RECONSTRUCTIONS WITH LIGHT MODULATORS

(75) Inventors: Bo Kroll, London (GB); Norbert Leister, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 290 days.

(21) Appl. No.: 12/596,156

(22) PCT Filed: Apr. 16, 2008

(86) PCT No.: PCT/EP2008/054584
§ 371 (c)(1),
(2), (4) Date: Dec. 18, 2009

(87) PCT Pub. No.: WO2008/128933
PCT Pub. Date: Oct. 30, 2008

(65) Prior Publication Data
US 2010/0103486 A1 Apr. 29, 2010

(30) Foreign Application Priority Data
Apr. 18, 2007 (DE) .......................... 10 2007 019 277

(51) Int. Cl.
*G03H 1/16* (2006.01)
(52) U.S. Cl. ....................................................... 359/29
(58) Field of Classification Search ................... 359/10, 359/11, 21, 29
See application file for complete search history.

(56) References Cited

U.S. PATENT DOCUMENTS

| | | | |
|---|---|---|---|
| 6,108,110 A * | 8/2000 | Orlov et al. | 359/22 |
| 6,842,285 B2 * | 1/2005 | Gluckstad | 359/559 |
| 7,652,809 B2 * | 1/2010 | Waldman et al. | 359/29 |
| 7,961,323 B2 * | 6/2011 | Tibbetts | 356/417 |
| 2003/0035190 A1 | 2/2003 | Brown et al. | |
| 2006/0139711 A1 * | 6/2006 | Leister et al. | 359/9 |
| 2009/0086296 A1 * | 4/2009 | Renaud-Goud | 359/9 |
| 2009/0303597 A1 * | 12/2009 | Miyawaki et al. | 359/559 |
| 2011/0149359 A1 * | 6/2011 | Leister | 359/9 |

FOREIGN PATENT DOCUMENTS

| | | |
|---|---|---|
| GB | 2 350 963 | 12/2000 |
| WO | WO 2006/116965 | 11/2006 |
| WO | WO 2008/049912 | 5/2008 |

OTHER PUBLICATIONS

International Search Report, dated Aug. 1, 2008, issued in priority International Application No. PCT/EP2008/054584 (in both German and English).

* cited by examiner

*Primary Examiner* — Jennifer L. Doak
(74) *Attorney, Agent, or Firm* — Saul Ewing LLP (57) ABSTRACT

A device for the production of holographic reconstructions having light modulators is disclosed. The device comprises at least one pixelated light modulator illuminated by at least one light source, and a focusing optical element field arrangement which images the light sources in an image plane after the light modulator. For the reconstruction, only one order of diffraction of the Fourier spectrum of the hologram should be used. The light modulator is provided with an assigned filter-aperture field arrangement which is located in the area of the image plane of the light source images and which has a plurality of aperture openings. Said aperture openings are designed in such a way that they each allow the passage of a prespecified area of the overall dimensions either smaller or the same as a diffraction order of the diffraction spectrum following Fourier transformation and produced from the holographic coding of the light modulator.

20 Claims, 6 Drawing Sheets

DEVICE FOR THE PRODUCTION OF HOLOGRAPHIC RECONSTRUCTIONS WITH LIGHT MODULATORS

CROSS REFERENCE TO RELATED APPLICATIONS

This application claims the priority of PCT/EP2008/054584, filed on Apr. 16, 2008, which claims priority to German Application No. 10 2007 019277.2, filed Apr. 18, 2007, the entire contents of which are hereby incorporated in total by reference.

BACKGROUND OF THE INVENTION

The present invention relates to a device for generating holographic reconstructions with light modulators, comprising:

- At least one pixelated light modulator, which is illuminated by at least one light source,
- A focussing optical element array, where each optical element is assigned to a group of encodable pixels of the light modulator, and where the optical elements image the light sources into an image plane downstream the light modulator so as to form light source images, and
- A control unit, which is connected to the light modulator, and which computes with the help of programming means the holographic code for the pixelated encoding surface of the light modulator.

The term 'pixelated light modulator' shall not necessarily be understood in the context of this invention as a modulator which comprises an arrangement of discretely controllable elements. It can also be a modulator with a continuous encoding surface, which is formally divided into discrete elements by the information to be displayed.

Further, the term 'optical elements' shall not necessarily be understood to be or to comprise conventional glass lenses, but it can be construed in a wider sense to be or to comprise refractive or diffractive optical elements which fulfill the same function.

A device for generating holographic reconstructions of representations, in particular three-dimensional scenes, is described in document WO 2006/119920 A1.

If information for example of a computer-generated hologram is stored on the pixelated light modulator, and if the light modulator is illuminated with sufficiently coherent light, a reconstruction of a three-dimensional scene will be generated in a reconstruction space. However, undesired periodic continuations also occur in the form of higher diffraction orders, because of the discrete representation of the hologram in the light modulator. Depending on the hologram encoding method employed, undesired regions can also occur within a diffraction order, which must therefore be filtered.

A conventional method for eliminating disturbing diffraction orders is to use a filter unit, e.g. a 4f arrangement, which can filter such diffraction orders. The filter unit can be dimensioned such that it only lets pass regions which are smaller than or identical to one diffraction order.

Such a method is applied for example in document DE 10 2005 023 743 A1. This document describes a holographic projection device and a method for generating holographic reconstructions of scenes using one-dimensionally and two-dimensionally encodable light modulators, said device comprising a light source, a focussing optical system, the corresponding light modulator, a projection system, and a filtering aperture, which is arranged between the light modulator and the projection system, and which lies in the image plane of the light source image.

The focussing optical system represents for the light modulator an optical illumination system, and for the light source an optical imaging system which images the light source into the image plane of the optical illumination system, where the Fourier transform of the light modulator is simultaneously generated in the image plane of the light source.

The projection device comprises a control unit which does not only encode the light modulator dynamically, but which also tracks the visibility region and thus the holographic reconstruction to a changing observer position. To achieve this, a position detection system is provided, which is connected to the control unit. The code on the light modulator is modified such that the reconstruction of the three-dimensional scene appears in a horizontal, vertical and/or axial position horizontally and/or vertically displaced and/or turned by an angle, according to the actual observer position.

In a dimensioned modification of the size relations of the above-described projection device in the form of a large, observer-friendly direct-view device, e.g. with a display with a diagonal of 20 inches, which is the size of a typical desktop monitor, a filtering process is performed on the light modulator, where a single light source is provided for the coherent illumination of the entire light modulator in conjunction with a filter unit. The direct-view device with the 20-inches display can comprise the light source, a focussing optical system, the corresponding light modulator, a projection system, and a filtering aperture, which is arranged between the light modulator and the projection system, and which lies in the image plane of the light source image. The filtering aperture comprises an opening which only lets pass the desired one diffraction order of the Fourier transform of the light modulator. The projection system images the aperture into another plane, which represents the observer plane at the same time. The observer in the observer plane can see the holographic reconstruction in a visibility region which corresponds to one diffraction order of the Fourier spectrum.

The corresponding filter unit requires in addition to the filtering aperture at least two lenses of which at least one is about as large as the light modulator that represents the display. This means for example in the case of the holographically encoded 20-inches display panel that one lens must have a diameter of at least 40 centimeters.

Because lenses typically only exhibit an adequate image quality at a ratio of focal length and aperture of much larger than one, and because the filtering takes place at the position of the light source image, here in the focal plane of the first lens, a filter unit first wide lens, filtering aperture, second wide lens—which has a depth of substantially larger than 40 centimeters in front of the light modulator panel is required in this example. In the direct-view device with a light modulator panel as a screen, if a large display is used (e.g. with a diagonal of 20 inches), it is rather complicated to provide a wide lens which has about the size of the screen, where, in addition, the filter unit has a very large depth, as described.

One problem is that the design of a holographic direct-view device with the described dimensions of the optical components is very voluminous and heavy, which is undesired.

A further problem is that, in display holography, because of the pixel dimensions of commercially available light modulators, only very small useable diffraction angles are provided, which, in turn, cause a small observer window.

According to a method of display holography described in document U.S. Pat. No. 3,633,989, HPO (horizontal-parallax-only) holograms are used, where a hologram encoding is only performed in one dimension. Values for the one-dimensional hologram are computed independently of each other and are typically written to individual rows of a light modulator. In order to increase the diffraction angle, hologram values, which are typically encoded in multiple pixels arranged side by side, can in this case be encoded in pixels which are arranged below one another in multiple rows.

When using one-dimensional holographic codes within the light modulator, it will only be possible for a one-dimensional holographic reconstruction to take place. The light wave diffracted by the one-dimensional HPO hologram of the light modulator accordingly extends in the horizontal direction in the visibility region.

SUMMARY OF THE INVENTION

It is therefore the object of the present invention to provide a device for generating holographic reconstructions with light modulators, said device being designed such that an expensive arrangement at least of the optical system can be avoided on the one hand and that the diffraction angle which is used for the visibility region can be increased, on the other hand. The dimensions of the device in the axial direction shall be kept as small as possible.

The object is solved with the help of the features of claim 1.

The device for generating holographic reconstructions with light modulators comprises:
   At least one pixelated light modulator, which is illuminated by at least one light source,
   A focussing optical element array, where each optical element is assigned to a group of encodable pixels of the light modulator, and where the optical elements image the light sources into an image plane downstream the light modulator so as to form light source images, and
   A control unit, which is connected to the light modulator, and which computes with the help of programming means the holographic code for the pixelated encoding surface of the light modulator,
where according to the characterising clause of claim 1 the light modulator is assigned with a filtering aperture array which has a multitude of apertures, and which is situated near the image plane of the light source images, and whose apertures in the filtering aperture array are formed such that they let pass a defined region of the diffraction spectrum which has been generated by holographic encoding of the light modulator, said defined region having a size that is smaller than or identical to one diffraction order of the Fourier transform.

A light source with an optical beam widening system can be arranged in front of the light modulator for illuminating the light modulator.

A dynamic shutter modulator can be provided between the optical beam widening system and the focussing optical element array.

As an alternative for illuminating the light modulator, a light source array with a multitude of light sources can be disposed in front of the light modulator.

The device can comprise a light source array, a first optical element array as an optical beam widening system, and a second optical element array with multiple spherical optical elements, e.g. in the form of spherical lenses, as a screen for the observer.

A power supply unit is assigned to the light source or the first light source array.

The control unit for encoding the light modulator is a part of a control system, which also comprises a unit for controlling the light source array, and/or a unit for controlling the filtering aperture array, and a position detection unit for detecting the actual observer position.

The position detection unit can be connected to the two units; at least by signal.

The two units can optionally be connected to a displacing device which displaces in their respective planes the light sources of the light source array, and/or the filtering apertures of the filtering aperture array, which represent the movable components, in response to signals from the position detection unit. However, the first and the second optical element array can also be of a displaceable design.

Both the light source array and the filtering aperture array can be designed either as static components, or as dynamic optical components which are adjusted by the control system.

The pixelated encoding surface of the light modulator can for example have pixels of a square design.

The first optical element array represents for the light modulator an optical illumination system, and for the light source array an optical imaging system which images the light source array into the focal plane which is given as the Fourier plane of the light modulator, where the images of the light source array coincide with the Fourier transform of the pixels of the respective subsection of the light modulator through which the light shines, and where the filtering aperture array which lets pass the given diffraction order is disposed near the focal plane.

The filtering aperture array can exhibit a grid of apertures which only let pass the given diffraction order of the Fourier transform, or only parts thereof.

The projecting second optical element array with the particularly two-dimensional spherical lenses images the apertures of the filtering aperture array into a second plane, which serves as the observer plane at the same time. Optical elements and filtering apertures are mutually arranged such that the images of all apertures overlap in the observer plane, thus forming an observer window.

The first optical element array can be a two-dimensional arrangement of spherical lenses which are disposed downstream the point light sources of the light source array.

A single spherical lens of the first optical element array and a single spherical lens of the second optical element array can have a size which typically ranges between about three and ten millimeters.

The size of the apertures of the filtering aperture array depends on the pixel pitch p of the light modulator and on the focal length of the lenses of the first optical element array.

The filtering aperture array can be a shutter modulator whose controllable openings have the dimensions of one or multiple pixels of the shutter modulator.

The programming means for encoding the pixels of the light modulator in the control unit can be adapted to the design of the device according to the present invention.

If HPO holograms are used, the hologram values can be encoded in multiple horizontally or vertically adjacently arranged pixels of one or multiple rows of the light modulator.

In the control system, in particular in the control unit, it is possible to carry out a holographic encoding in only one dimension, where the values written to a group of rows or columns of the light modulator are related to each other.

The first optical element array can then be a lenticular array with cylindrical lenses, which is illuminated by line light sources and which is assigned with a filtering aperture array with slotted apertures.

A sufficiently coherent illumination of the light modulator must then only be achieved in the area of the group of a few rows.

In order to track the visibility region to the observer, a dynamic shutter modulator for displacing the position of the apertures can be used as a filtering aperture array.

The light source array can comprise an arrangement of adjacent light sources which can be turned on individually one after another, where said arrangement illuminates a certain vertical section in a certain interval of time, which can be controlled by the control system.

In order to enlarge the visibility region used by the observer, particularly in the vertical direction, diverging lenses can be used, where the entirety of diverging lenses can also have the form of a diverging lens array, which is disposed directly downstream the filtering aperture array.

Optionally, depending on the design and encoding method used for the light modulator, one-dimensional, slotted filtering aperture arrays or two-dimensional filtering aperture arrays with round apertures can be employed.

The filtering aperture array can be designed statically in the form of an aperture mask.

In order to track the visibility region or to periodically scan a certain viewing range, a dynamic filtering aperture array can be provided which is realised with the help of the controllable displacing devices of the control system.

The filtering aperture array can be a fast switching amplitude-modulating light modulator where the variation of the transmittance of individual pixels causes a filtering effect, where the activated pixels, which then serve as apertures, roughly correspond to the size of the opening of the apertures of the static filtering aperture array.

The light source array can, in agreement with the dynamic filtering aperture array, be a fast switching amplitude-modulating light modulator, which is entirely illuminated by a light source, and where the variation of the transmittance of individual pixels causes light beams to be let pass, where the pixels, which then serve as openings for beam passage, have about the size of the diameter of the light sources of the static light source array.

BRIEF DESCRIPTION OF THE DRAWINGS

The present invention will be described in more detail below with the help of a number of embodiments and drawings, wherein:

FIG. 4 shows schematically the side view of a device for generating holographic reconstructions according to the present invention with an adjustable filtering aperture array and an adjustable light source array according to FIG. 1 and FIG. 3a;

DETAILED DESCRIPTION

Figures 1, 2:
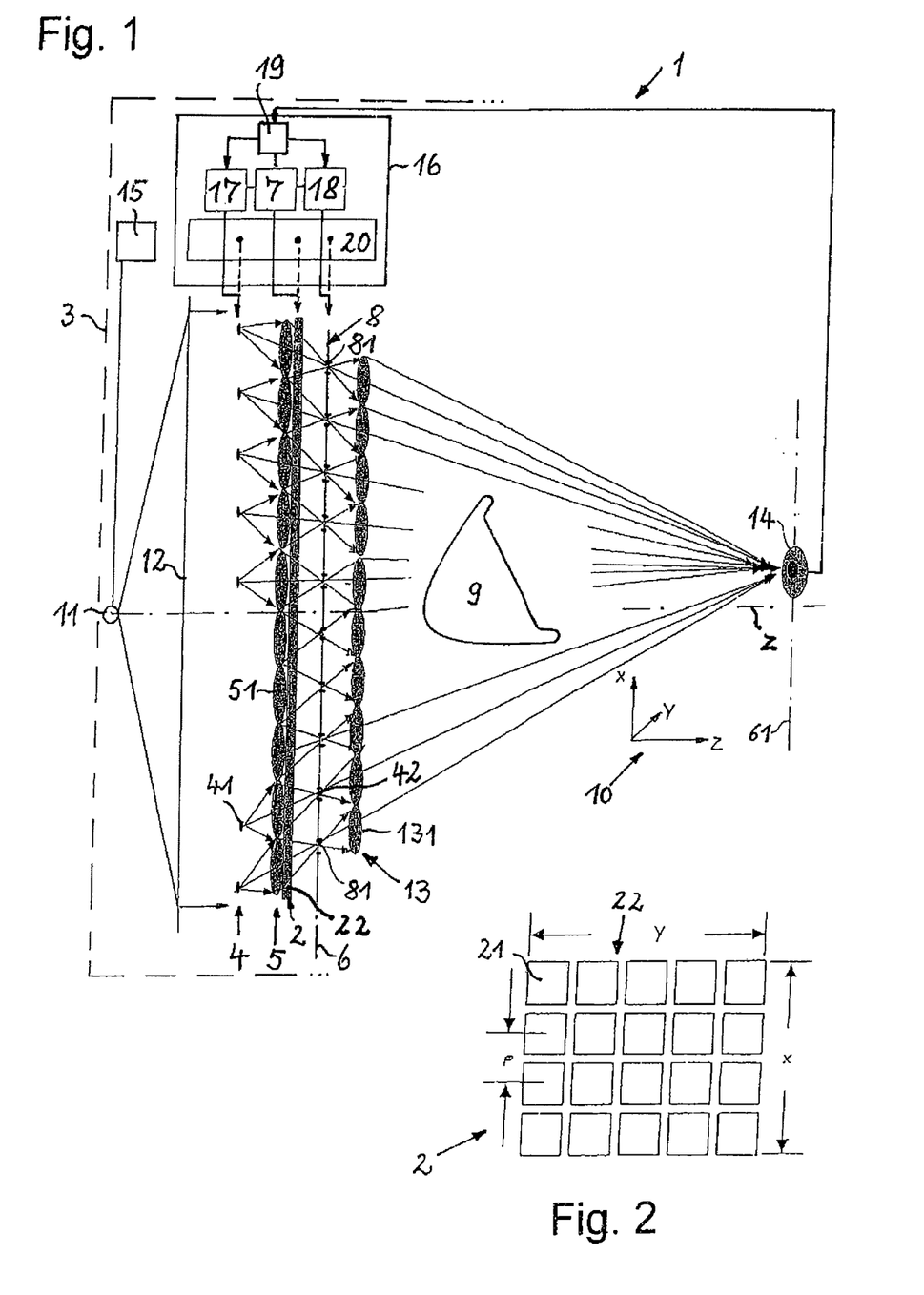
FIG. 1 shows schematically the side view or top view of a device for generating holographic reconstructions according to the present invention.
FIG. 2 shows a detail of the encoding surface of a two-dimensionally encodable, pixelated light modulator with square pixels.

FIG. 1 shows schematically a device 1 for the holographic reconstruction of a three-dimensional scene 9 according to the present invention with a light modulator 2, said device having a housing 3 which comprises at least:

A light source array 4 with multiple light sources 41,

At least one pixelated light modulator 2, which is disposed downstream the light source array 4, A focussing lens array 5, where each lens 51 is assigned to a group of encodable pixels 21 of the light modulator 2, and where the lenses 51 image the individual light sources 41 of the light source array 4 into an image plane 6 downstream the light modulator 2 so as to form light source images 42, and A control unit 7, which is connected to the light modulator 2, and which computes with the help of programming means the holographic code for the pixelated encoding surface 22 of the light modulator 2.

According to the present invention, the light modulator 2 is assigned with a filtering aperture array 8 which has a multitude of apertures 81, and which is situated near the image plane 6 of the light source images 42, and whose apertures 81 in the filtering aperture array 8 are formed such that they let pass one specific diffraction order or parts thereof of the diffraction spectrum which has been generated by holographic encoding of the light modulator.

The inventive device 1 according to FIG. 1 can further comprise a light source 11 with an optical beam widening system 12 and a second lens array 13 with multiple spherical lenses 131 as a screen for the observer 14, instead of a light source array 4. A power supply unit 15 is assigned to the light source 11 or, independent of the light source 11, to the first light source array 4. The control unit 7 for encoding the light modulator 2 can be a part of a control system 16 which, according to FIG. 1, can further comprise a unit 17 for controlling the light source array 4 and a unit 18 for controlling the filtering aperture array 8 and a position detection unit 19 for detecting the position of the observer 14. The position detection unit 19 is connected to the two units 17 and 18, at least by signal. The two units 17 and 18 are connected to a displacing device 20 which displaces the movable components in their respective planes, e.g. the light sources 41 of the light source array 4, and/or the filtering apertures 81 of the filtering aperture array 8, or the lenses 51 of the lens array 5, in response to signals from the position detection unit 19.

FIG. 1 thus shows a filtering process on a holographically encoded light modulator 2, which forms a part of the device 1 according to the present invention, and in which the light source array 4 is used in conjunction with the first lens array 5, the filtering aperture array 8 and the second lens array 13.

FIG. 2 shows schematically the pixelated encoding surface 22 of the light modulator 2, where the pixels 21, which are here of a square design, are disposed in the xy plane of the xyz coordinate system 10 which is shown in FIG. 1. Here, p denotes the distance between the centres of two adjacent pixels 21, and the coordinate z denotes the axial direction in which the optical components which belong to the device 1 are disposed.

Referring to FIG. 1, the first optical element array 5 represents for the light modulator 2 an optical illumination system, and for the light source array 4 an optical imaging system which images the light source array 4 into the focal plane 6 which is given as the Fourier plane of the light modulator, where the images of the light source array 4 coincide with the Fourier transform of the pixels of the respective subsection of the light modulator 2 through which the light shines, and where the filtering aperture array 8 which lets pass the given diffraction order is disposed near the focal plane. The filtering aperture array 8 exhibits a grid of apertures 81 which only let pass the given diffraction order of the Fourier transform or parts thereof. The projecting second lens array 13 with the two-dimensionally arranged spherical lenses 131 images the apertures 81 into a second plane 61, which serves as the observer plane at the same time, where the images of the individual apertures 81 overlap in a visibility region. The holographic reconstruction 9 of the three-dimensional scene can be seen by an observer 14 in the observer plane 61, in the visibility region which corresponds to one diffraction order of the Fourier spectrum.

The first optical element array 5 can be a two-dimensional arrangement of spherical lenses 51 which are disposed downstream the point light sources 41 of the light source array 4, where a two-dimensional filtering aperture array 8 of apertures 81 and a second optical element array 13 are provided as well. FIG. 1 shows a sectional view of the device 1 through the rows or columns of the arrays 4, 5, 6, 13.

A single lens 51 of the first optical element array 5 and a single lens 131 of the second optical element array 13 can for example have a size which typically ranges between three and ten millimeters.

The total depth of the device 1 in the z direction only increases moderately due to the filtering with the arrays 4, 5, 6, 13, and is much smaller than the dimensions of the arrangement involving wide lenses which are described in the prior art section.

The filtering aperture array 8 here is a two-dimensional grid with small openings, namely the apertures 81. The size of the apertures 81 depends on the pixel pitch p of the light modulator 2, as shown in FIG. 2, and on the focal length of the lenses 51 of the first optical element array 5, which determine the extent of a diffraction order in the Fourier plane. A given value can be in the range of between 0.1 mm and 0.2 mm.

The filtering aperture array 8 can alternatively be a shutter modulator with controllable openings which have the dimensions of one or multiple pixels of the shutter modulator.

The programming means for the holographic encoding of the pixels 21 of the light modulator 2 in the control unit 7 can be adapted to the design of the device 1.

Figures 3, 3A:
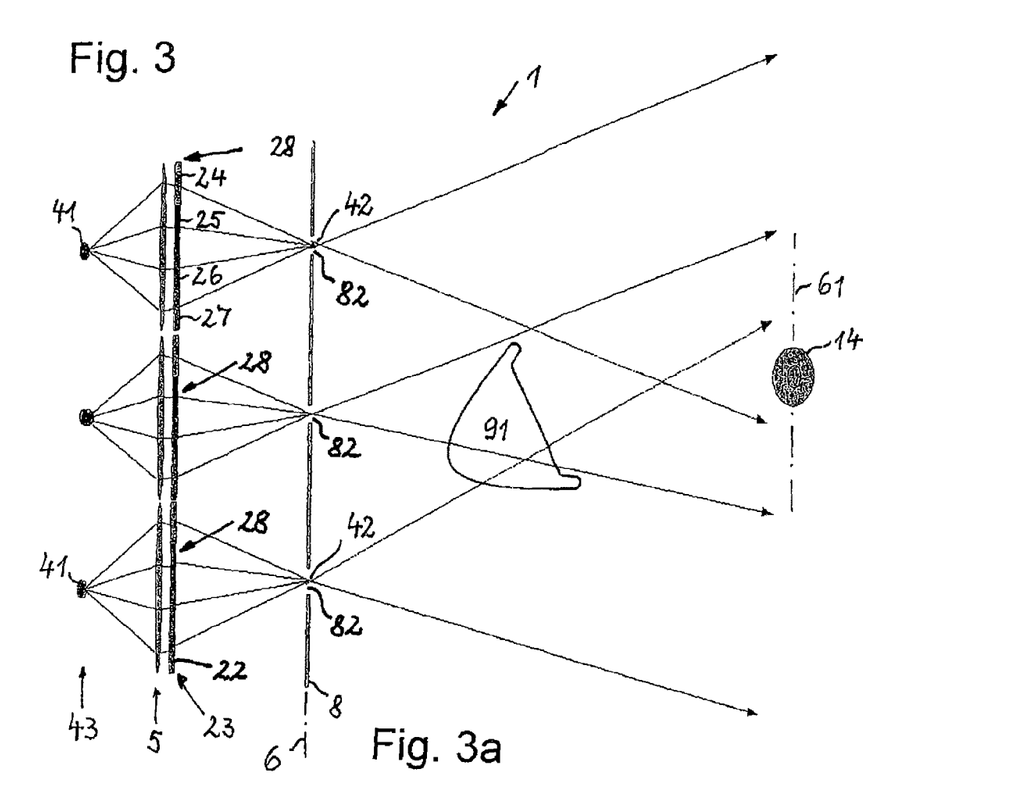
FIG. 3 shows schematically the side view of a variant of the device for generating holographic reconstructions according to the present invention, where
FIG. 3a shows the arrangement of device components which are essential to the invention.

FIGS. 3, 3a shows schematically the device 1 for generating holographic reconstructions 91 according to the present invention, in a reduced form compared to FIG. 1, comprising a light source array 43, a first optical element array 5, a light modulator 23, and a filtering aperture array 8 which is disposed downstream the light modulator 23 and which lies in the image plane 6 of the light source images 42.

Figure 3B:
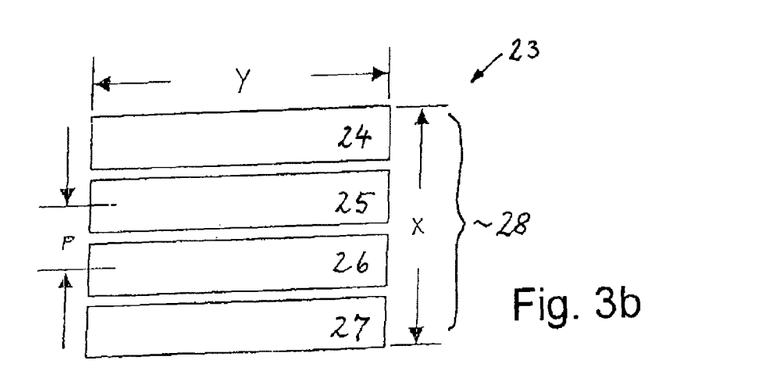
FIG. 3b shows a detail of the encoding surface of a one-dimensionally encodable, pixelated light modulator.

In order to reduce the required hologram computing time, HPO (horizontal parallax only) holograms are used in prior art display holography, where the hologram is only encoded in one dimension, e.g. in the y direction, as shown in FIGS. 3, 3b. Amplitude and phase values which are computed independently of each other are typically written to individual rows of the light modulator 23. When using one-dimensional holographic encoding 24, 25, 26, 27 within the light modulator 23, it will only be possible for a one-dimensional holographic reconstruction to take place. The light wave which is for example diffracted by the one-dimensional HPO hologram of the light modulator 23 accordingly only extends in the horizontal direction in the visibility region in the plane 61.

Here, the first optical element array 5 and/or the second optical element array 13, as shown in FIG. 1, can be lenticular arrays with cylindrical lenses which are illuminated by line light sources 41 and which are assigned to a filtering aperture array 8 with slotted apertures 82. For HPO holograms, FIG. 1 shows a top view of the device 1. However, it is generally also possible to use VPO (vertical parallax only) holograms, where everything is turned by 90 degrees.

In order to enlarge the diffraction angle and thus the useable visibility region in the plane 61, it can be possible in the case of an HPO hologram for example to use a combination of multiple rows of a hologram, instead of multiple columns, in order to encode a complex hologram value.

One possibility for the computation in the control unit 7 is here for example a representation of a complex number by multiple phase values, where the one-dimensional arrangement of complex hologram values is computed in the horizontal direction, i.e. in the y direction, while the phase values which form a complex number are arranged in pixels one above another in the vertical direction. To achieve this, a coherent illumination is only required for a group 28 of a few rows 24, 25, 26, 27. If a group 28 of rows 24, 25, 26, 27 of a light modulator 23 is coherently illuminated, this will cause in the vertical direction, i.e. in the x direction an undesired retardation of optical path among the individual rows, where said retardation is angle-specific, and leads to a deviation of the expected reconstruction.

FIG. 3a shows that, if multiple rows 24, 25, 26, 27 are coherently illuminated, the hologram computation will only be carried out with horizontal parallax, and the filtering process will be carried out with the help of a filtering aperture array 8 with slotted apertures 82; each one for a group 28 of coherently illuminated rows 24, 25, 26, 27. This makes it possible to encode hologram values which were hitherto encoded in horizontally adjacently arranged pixels, in pixels which are arranged vertically below one another.

Figure 4:
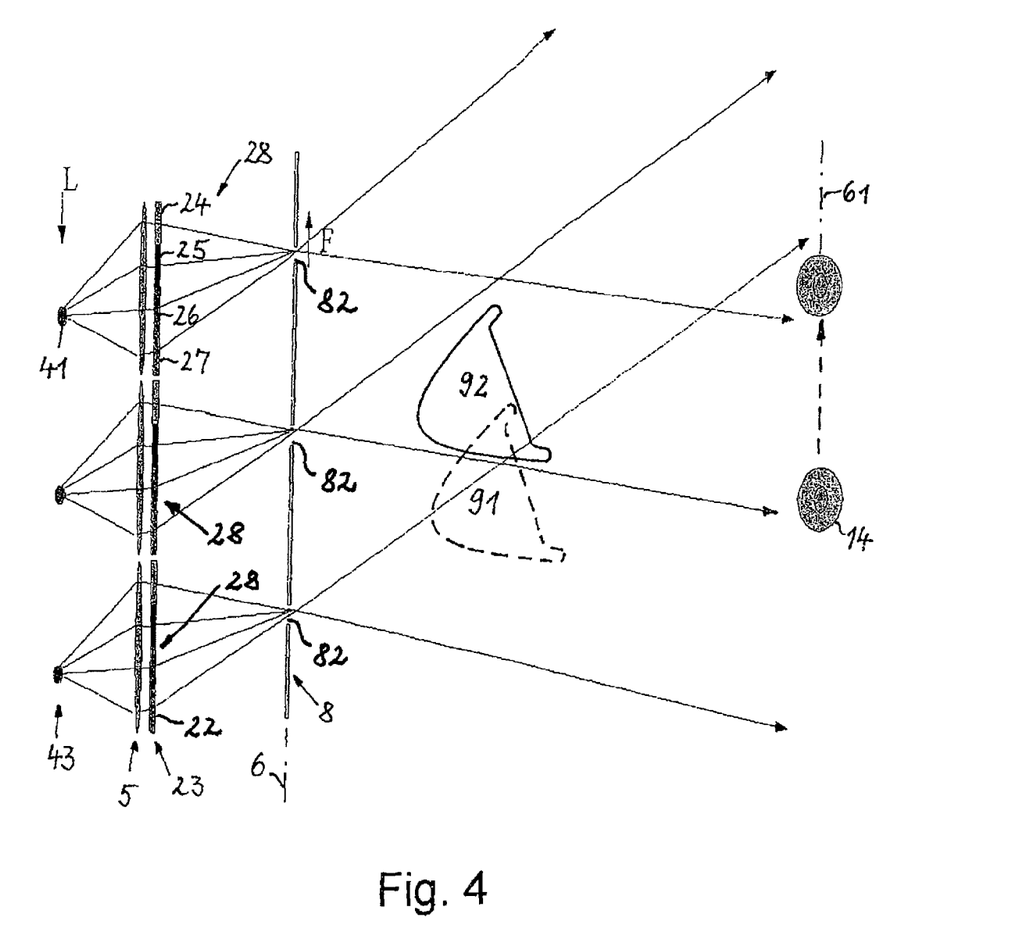
Figure 5:
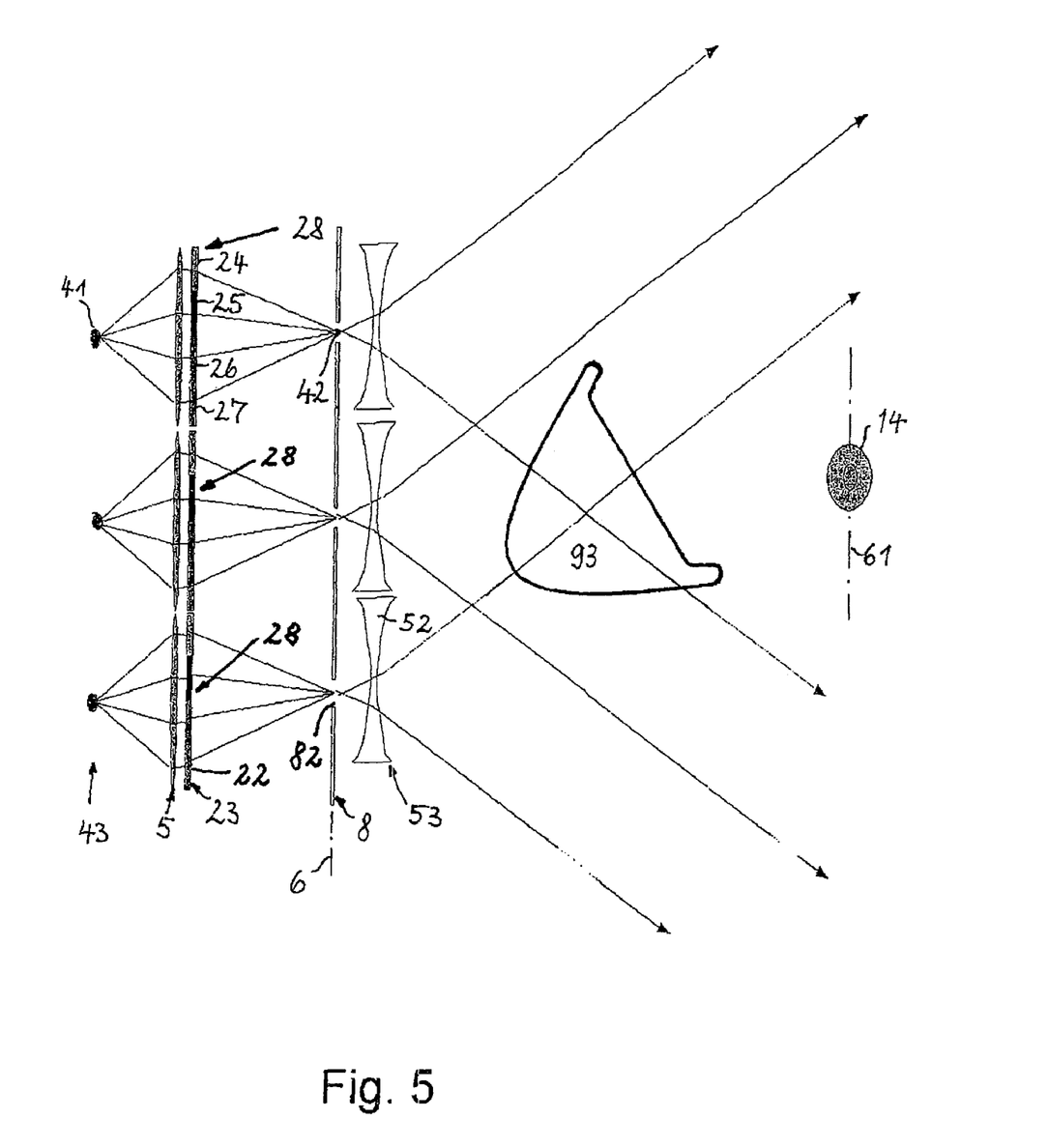
FIG. 5 shows schematically the side view of a device for generating holographic reconstructions according to the present invention according to FIG. 3a with a dispersing lens array.

While filtering units of a 4f-arrangement type according to FIG. 1 require an arrangement of at least two optical element arrays 5 and 13 disposed one behind another of which the first optical element array 5 realizes a Fourier transformation and the second optical element array 13 realizes a back-transformation, a back-transformation to the image plane 6, as shown in FIGS. 3, 4, 5, is not necessary in this embodiment of the device, where few light modulator rows 24, 25, 26, 27 are coherently added.

The complex amplitude and phase values on the light modulator 23, as shown in FIGS. 3a, 4, 5, are computed in the control unit 7 just by way of a one-dimensional Fourier transformation in the horizontal direction.

In the vertical direction, the desired signal itself, as a coherent addition of multiple light modulator rows 24, 25, 26, 27, is transmitted (or undesired portions thereof are filtered out) in the image plane 6, and not its Fourier transform. However, an observer 14 must also be able to move vertically within the visibility region in the plane 61, so that he can watch the original reconstruction 91, or the accordingly displaced reconstruction 92, from multiple vertical positions, as shown in FIG. 4. To achieve this, light must propagate from the image plane 6 to the corresponding vertical position.

FIG. 5 shows a diverging lens array 53, which is disposed downstream the image plane 6, and which widens the angle under which the light propagates in the vertical direction.

However, a preferred alternative for adjusting the visibility region in the plane 61 to the observer 14 can be a dynamic shutter for displacing the position of the apertures 81 or 82 in the filtering aperture array 8. This can be achieved in conjunction either with a modification of the values represented on the light modulator 2, 23—for example by adding a certain phase offset for an entire row when employing a phase encoding method—or with a movable light source array 4. This has the advantage that a light modulator 2 with comparatively slow switching speed can be used as well.

Referring for example to FIG. 4, the latter can also be a light source array 4 where adjacently arranged light sources 41 are switched on one after another controlled by the unit 17 for controlling the light source array 43. A certain vertical section, which is given with the direction sign L, can thus be scanned in a certain interval.

FIG. 4 also shows a possible displacement, with the direction sign F, of the apertures 82 of the filtering aperture array 8 in the image plane 6, where the filtering aperture array 8 can also be a dynamic light modulator.

FIG. 5 illustrates the above-mentioned possibility to use additional diverging lenses 52 for enlarging the usable visibility region in the plane 61 for the observer 14, where the entirety of the parallel-oriented diverging lenses 52 has the form of a diverging lens array 53, which can be disposed directly downstream the filtering aperture array 8.

In conjunction with a light source array 4, the device 1 according to the present invention allows undesired diffraction orders to be filtered out for each single section of a hologram, which is illuminated with sufficient coherence by a light source 41. This particularly allows small, compact filter units to be used, which can also be disposed in front of a large holographic screen 13. Optionally, depending on the design and encoding method used for the light modulator 2, 23, one-dimensional directed —preferably slotted —filtering aperture arrays 8, or two-dimensional filtering aperture arrays 8 —preferably with round apertures —can be used.

The filtering aperture array 8 can be static, in the form of an aperture mask.

A further embodiment of the device 1, which allows a certain visibility region in the plane 61 for the observer 14 to be tracked or to be scanned periodically, is the dynamic design of the filtering aperture array 8 through the controllable displacing devices 20 of the control system 16.

The filtering aperture array 8 can then for example be a fast switching amplitude-modulating light modulator where the variation of the transmittance of individual pixels or pixel groups effects a filtering. The pixels or pixel groups, which can then serve as apertures 81, then have about the size of the opening of the apertures 81. Because the individual filter units of the filtering aperture array 8 are illuminated by light sources which are incoherent in relation to each other, no new diffraction structure will be created by the filtering aperture array 8.

The light source array 4 can, in agreement with the filtering aperture array 8, be a fast switching amplitude-modulating light modulator, where the variation of the transmittance of individual pixels or pixel groups causes light to be let pass, where the pixels or pixel groups, which then serve as openings for light passage, have about the size of the diameter of the light sources 41 of the static light source array.

A preferred application of the filtering aperture array described above is to filter out an angle-dependent phase shift among pixels, which is not desired but cannot be avoided when encoding complex hologram values in multiple adjacent phase pixels. This undesired phase shift, which occurs in addition to a programmed, desired phase shift, is caused by the fact that the pixels which represent one hologram value are arranged side by side and not one behind another. This will now be explained with the example of an embodiment where the optical element arrays 5 and 13 and the filtering aperture array 8 are understood to form a 4f filtering arrangement, and where one complex hologram value is encoded with the help of mere phase values in two adjacent pixels.

Figure 6:
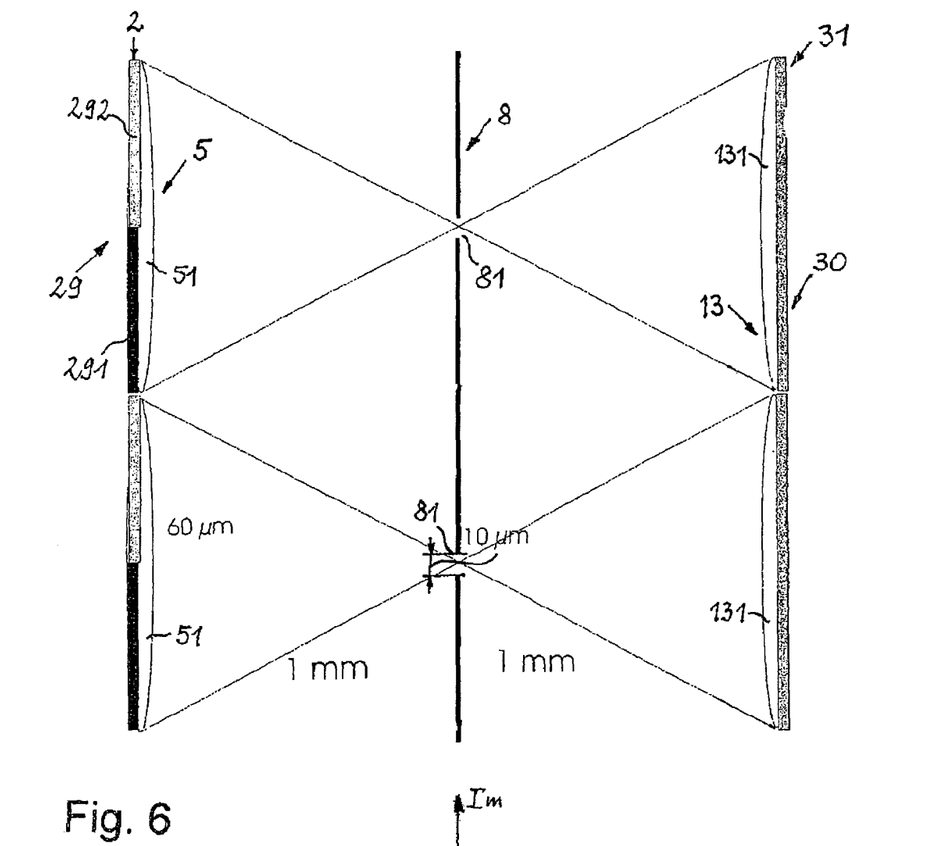
FIG. 6 shows schematically a part of a 4f arrangement of the device according to this invention.

FIG. 6 shows a longitudinal section of a part of a 4f arrangement 31 with a light modulator 2, a first focussing optical element array 5, which is disposed downstream in this embodiment, and a second focussing optical element array 13, which is disposed downstream, after which the filtered pixel information of the light modulator 2 is provided as an exit 30, where the filtering aperture array 8 with the apertures 81 is disposed between the two optical element arrays 5 and 13.

The first optical element array 5 comprises focussing lenses as optical elements 51, and the second optical element array 13 also comprises focussing lenses as optical elements 131, where the two optical element arrays can be designed in the form of lenticular arrays.

Two pixels 291, 292 each form a group or macro pixel 29 for the two-phase encoding of the complex hologram value, where the macro pixel 29 has the same size as the lenses 51. The size of the lenses 51 is exemplarily given as 60 μm in FIG. 6, the apertures 81 have a size of 10 μm, and the distances between the light modulator 2 and the filtering aperture array 8, and between the exit 30 and the filtering aperture array 8 are 1 mm each. The dimensions are specified in particular in order to provide a comparison to the dimensions of the prior art direct-view device.

Figure 7:
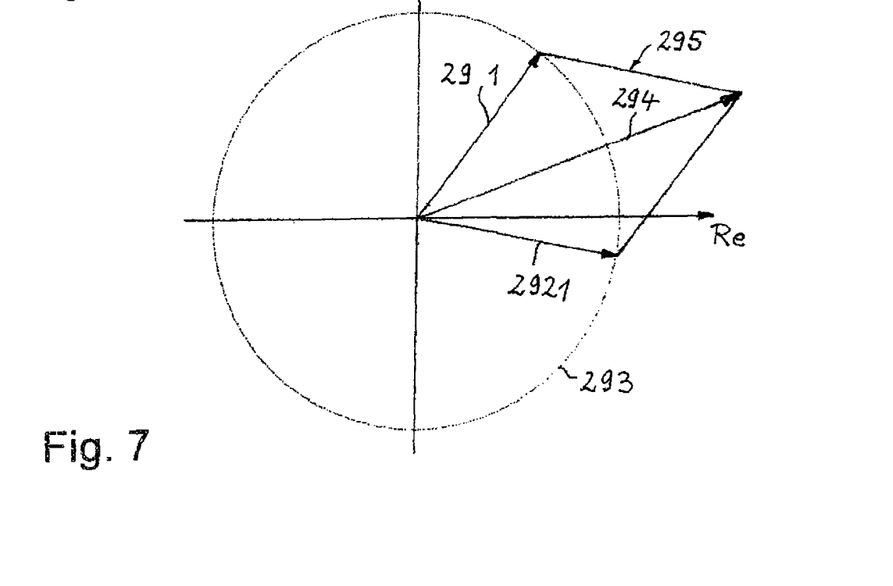
FIG. 7 shows the phases of the two pixels of the macro pixel at the phase unit circle according to FIG. 6.

FIG. 7 shows the encoding of a complex hologram value by two mere phase values in the phase unit circle 293 with the axes Im (imaginary part) and Re (real part), where the phase 2911 of the pixel 291 and the phase 2921 of the pixel 292 of the light modulator 2 are added according to a parallelogram 295 so as to form a resultant complex value 294 of the macro pixel 29, where said resultant value exhibits the desired amplitude value different from 1 and the desired phase value. This is illustrated in FIG. 8 with a numerical example.

Figures 8, 8A:
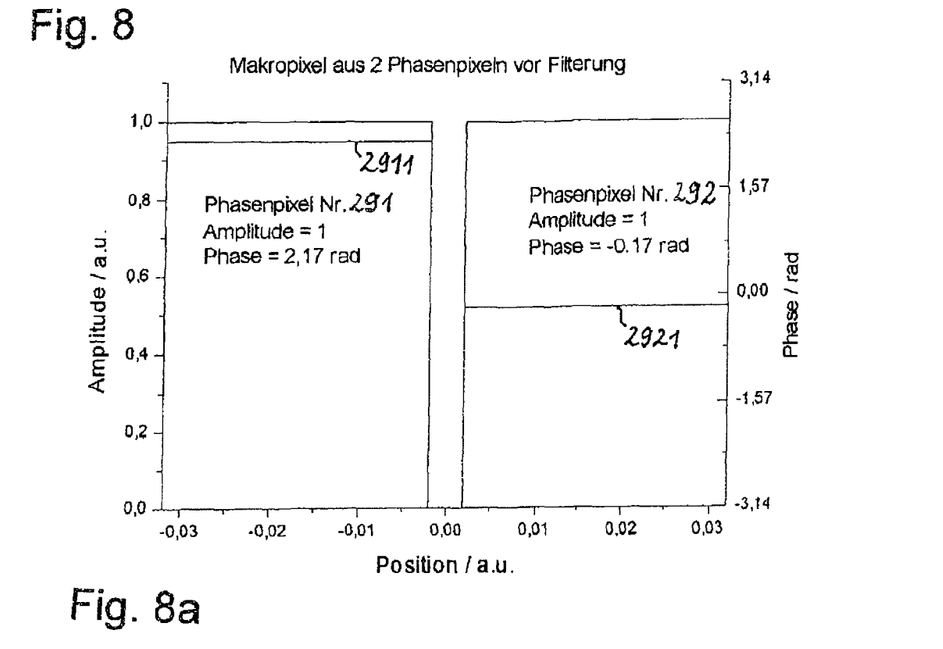
FIG. 8 shows two amplitude-phase position diagrams for a macro pixel which comprises two pixels according to FIGS. 6 and 7, where
FIG. 8a shows the dependence of the amplitude on the position before the filtering.

FIG. 8a shows a two-phase representation of a complex value of 0.3 exp 1.1i of an ideal complex-valued macro pixel 32, where the amplitude is represented by the value '0.3' and the phase by the value '1.1rad'. According to FIG. 7, the complex value is created from the two encoded phase values 1 exp 2.17i of the pixel 291 and 1 exp −0.17i of the pixel 292. The amplitudes of the two phase pixels are identical and have the value '1', the pixel phase 2911 of the pixel 291 is '2.17rad', and the pixel phase 2921 of the pixel 292 is '−0.17rad'.

In addition to the shown phase values of the two single pixels, a further, illumination-angle-dependent phase shift would occur between the two pixels if they were illuminated at an oblique angle, because the pixels are disposed side by side. This additional phase shift would falsify the desired complex value, but it is filtered out by the 4f filtering for each pixel group, so that the macro pixel 32 indeed exhibits the desired phase and amplitude value at the exit of the 4f system.

Figure 8B:
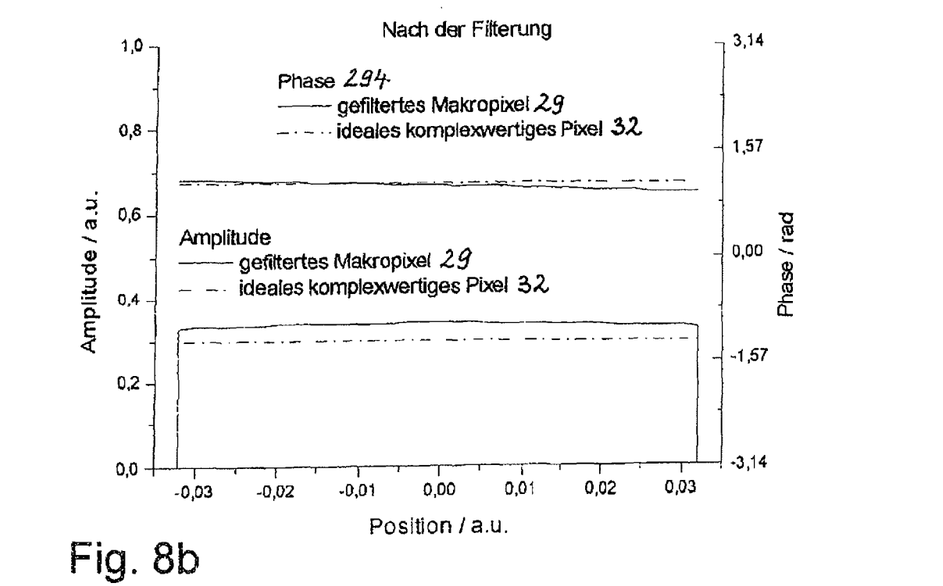
FIG. 8b shows the amplitude in dependence on the position after filtering by a lenticular array.

FIG. 8b shows a comparison before and after the filtering in the image plane 6 between practical filtering in the 4f arrangement 31 and calculated filtering, where the values before filtering the encoding of the pixels 291, 292 in the light modulator 2, and the values after filtering at the exit 30 immediately downstream the optical element array 13, which can be a lenticular arrangement, are represented by the straight line as regards amplitude and phases, said straight line being drawn almost parallel to the position coordinate. The minor deviations in FIG. 8b as regards both the resultant amplitude distribution and the resultant phase distribution between the filtered macro pixel 29 and the ideal complex-valued macro pixel 32 can be widely neglected, and there is great agreement between the function of the device 1 according to this invention and the calculations of the complex values with programming means used.

LIST OF REFERENCE NUMERALS

1 Device
2 First light modulator
21 Pixel
22 Encoding surface
23 Second light modulator
24 First line
25 Second line
26 Third line
27 Fourth line
28 Group
29 Macro pixel
291 First pixel
2911 Pixel phase
292 Second pixel
2921 Pixel phase
293 Unit circle
294 Resultant phase
295 Phase parallelogram
3 Casing
4 First light source array
41 Light sources
42 Light source images
43 Second light source array
5 First optical element array
51 Lenses
52 Diverging lenses
53 Diverging lens array
6 Image plane
61 Plane of the visibility region
7 Control unit
8 Filtering aperture array
81 First apertures
82 Second apertures
9 Reconstruction
91 Reconstruction
92 Displaced reconstruction
93 Enlarged reconstruction
10 xyz coordinate system
11 Light source
12 Optical beam widening system
13 Second optical element array
131 Lenses
14 Observer
15 Power supply unit
16 Control system
17 Unit for controlling the light source array
18 Unit for controlling the filtering aperture array
19 Position detection system
20 Displacing devices
30 Exit
2 Part of a 4f arrangement
32 Ideal complex-valued macro pixel
Im Imaginary part
Re Real part

The invention claimed is:

1. Device for generating holographic reconstructions with at least one light modulator, comprising:

A light source or a light source array comprising multiple light sources,

At least one pixelated light modulator, which is illuminated by at least one light source, A first focussing optical element array, where each optical element is assigned to a group of encodable pixels of the light modulator, and where the optical elements image the at least one light source into an image plane behind the light modulator so to form light source images, A second focussing optical element array having optic elements being assigned to the optic elements of the first focussing optical element array and being arranged in a distance of their focal length behind the image plane such that they project the light bundles emanating from them to an eye of a viewer into a viewing region, and A control unit, which is connected to the light modulator, and which computes with the help of programming means the holographic code for the pixelated encoding surface of the light modulator, wherein the light modulator is assigned with a filtering aperture array which has a multitude of apertures, and which is situated near the image plane of the light source images and which forms together with the first focussing optical element array and the second focussing optical element array a 4f-filter-system, and whose apertures in the filtering aperture array are formed such that they let pass a defined region of the diffraction spectrum which has been generated by holographic encoding of the light modulator, said defined region having a size that is smaller than or identical to one diffraction order of the Fourier transform.

2. Device according to claim 1, wherein a light source with an optical beam widening system and the focussing optical element array are disposed in front of the light modulator for illuminating the light modulator.

3. Device according to claim 1, wherein a dynamic shutter modulator is provided between the optical beam widening system and the focussing optical element array.

4. Device according to claim 3, wherein in order to track the visibility region in the plane to the observer, the dynamic shutter modulator for displacing the position of the apertures is used as filtering aperture array.

5. Device according to claim 1, wherein a light source array with a multitude of light sources is disposed in front of the light modulator for illuminating the light modulator.

6. Device according to claim 5, wherein the light source array comprises an arrangement of adjacent light sources which can be turned on individually one after another, where said arrangement illuminates a vertical section in a certain interval, which can be controlled by the control system or wherein diverging lenses are provided for enlarging the usable visibility region in the plane for the observer in the vertical direction, where the entirety of the parallel-oriented diverging lenses also has the form of a diverging lens array, which is disposed directly downstream the filtering aperture array.

7. Device according to claim 1, wherein it comprises a second optical element array with a multitude of spherical optical elements, which forms the screen for the observer, and which is disposed downstream the filtering aperture array.

8. Device according to claim 7, wherein the projecting second optical element array with the two-dimensionally arranged spherical optical elements images the apertures of the filtering aperture array into a plane, to which the visibility region is assigned, and which serves as the observer plane at the same time, where the optical elements and filtering apertures are mutually arranged such that the images of all apertures in the observer plane overlap, thus forming one observer window.

9. Device according to claim 1, wherein the control unit for encoding the light modulator is a part of a control system, which also comprises a unit for controlling the light source array, and/or a unit for controlling the filtering aperture array and/or the first optical element array and/or the second optical element array, and a position detection unit for detecting the actual position of the observer.

10. Device according to claim 9, wherein the position detection unit is connected to the two units, at least by signal and in that the two units are connected to a displacing device which displaces the movable components in their respective planes, i.e. the light sources of the light source array, and/or the filtering apertures of the filtering aperture array, and/or the first optical element array and/or the second optical element array, in response to signals from the position detection unit.

11. Device according to claim 10, wherein in order to track the visibility region in the plane or to periodically scan a certain visibility region in the plane, a dynamic filtering aperture array can be realised with the help of the controllable displacing devices of the control system.

12. Device according to claim 1, wherein the arrays are designed both as static optical components and as dynamic optical components which are controlled by the control system.

13. Device according to claim 12, wherein the dynamic filtering aperture array is a controllable amplitude-modulating light modulator, where the variation of the transmittance of individual pixels causes a filtering effect, where the activated pixels, which then serve as apertures, roughly correspond to the size of the opening of the apertures of a static filtering aperture array.

14. Device according to claim 1, wherein the first optical element array represents for the light modulator an optical illumination system, and for the light source array an optical imaging system which images the light source array into the focal plane, which also forms the image plane, and which is given as the Fourier plane of the light modulator, where the images of the light source array coincide with the Fourier transform of the pixels of the respective subsection of the light modulator through which the light shines, and where the filtering aperture array which lets pass the given diffraction order or parts thereof is disposed near the image plane.

15. Device according to claim 14, wherein the filtering aperture array exhibits a grid of apertures in the form of aperture masks, which only let pass the given diffraction order of the Fourier transform or parts thereof or wherein the first optical element array is a two-dimensional arrangement of spherical lenses, which are disposed behind the point light sources of the first light source array.

16. Device according to claim 15, wherein the size of the apertures of the filtering aperture array depends on the pixel pitch of the light modulator and on the focal length of the lenses of the first optical element array.

17. Device according to claim 1, wherein the filtering aperture array is a shutter modulator whose controllable openings have the dimensions of one or multiple pixels of the shutter modulator according to the extension of one diffraction order or parts thereof or wherein the first optical element array is a lenticular array with cylindrical lenses, which is illuminated by line light sources, and which is assigned with a filtering aperture array with slotted apertures.

18. Device according to claim 1, wherein depending on the design and encoding method used for the light modulator, one-dimensional, slotted filtering aperture arrays or two-dimensional filtering aperture arrays with round apertures are employed.

19. Device according to claim 18, wherein the filtering aperture array is static and has the form of an aperture mask.

20. Device according to claim 1, wherein the dynamic light source array is, in agreement with the filtering aperture array, a controllable amplitude-modulating light modulator, which is entirely illuminated by a light source, and where the variation of the transmittance of individual pixels causes light beams to be let pass, where the pixels, which then serve as openings for beam passage, have about the size of the diameter of the light sources of a static light source array.

* * * * *